United States Patent [19]

Merienne et al.

[11] Patent Number: 5,417,757
[45] Date of Patent: May 23, 1995

[54] LIQUID PRECURSOR FOR THE PRODUCTION OF FLUORINE DOPED TIN OXIDE COATINGS AND CORRESPONDING COATING PROCESS

[75] Inventors: Gilles Merienne, Villemoisson Sur Orge; Dominique Valette, Massy; Marcel Durant, Mennecy, all of France

[73] Assignee: Produits Chimiques Auxiliaires Et De Synthese, (P.C.A.S.) (S.A.), Longjumeau Cedex, France

[21] Appl. No.: 231,827

[22] Filed: Apr. 25, 1994

[30] Foreign Application Priority Data

May 3, 1993 [FR] France ................ 93 05245

[51] Int. Cl.$^6$ ................................ C09D 5/33
[52] U.S. Cl. ................................ 106/286.4
[58] Field of Search ........................ 106/286.4

[56] References Cited

U.S. PATENT DOCUMENTS

| | | | |
|---|---|---|---|
| 3,759,743 | 9/1973 | Menke | 106/286.4 |
| 4,265,974 | 5/1981 | Gordon | 428/432 |
| 4,293,594 | 10/1981 | Yoldas et al. | 427/107 |
| 4,857,095 | 8/1989 | Brown | 427/160 |
| 5,314,534 | 5/1994 | Giersberg et al. | 106/286.4 |

FOREIGN PATENT DOCUMENTS

| | | |
|---|---|---|
| 0112780 | 7/1984 | European Pat. Off. . |
| 0158339 | 10/1985 | European Pat. Off. . |
| 0158399 | 10/1985 | European Pat. Off. . |
| 0312886 | 4/1989 | European Pat. Off. . |
| 0338417 | 10/1989 | European Pat. Off. . |
| 1036647 | 9/1953 | France . |
| 50-61415 | 5/1975 | Japan . |
| 62-70247 | 3/1987 | Japan . |

OTHER PUBLICATIONS

Chemical Abstract, vol. 107, No. 6, (Aug. 10, 1987,) Columbus, Ohio, US, p. 328, No. 45025f.

*Primary Examiner*—David Brunsman
*Attorney, Agent, or Firm*—Sandler, Greenblum & Bernstein

[57] ABSTRACT

A liquid precursor for the production of fluorine doped tin oxide coatings including 60 to 90% by weight of at least one chlorinated organotin derivative, 5 to 30% by weight of at least one organotin mono(fluoroalkanoate), and 0 to 15% by weight of a tetraorganotin compound. Using vapor phase deposition, this produces a coating with low surface resistance and a high light transmission coefficient. Deposition is effected quickly so the precursor can readily be used to coat a moving substrate, for example, float glass.

16 Claims, No Drawings

LIQUID PRECURSOR FOR THE PRODUCTION OF FLUORINE DOPED TIN OXIDE COATINGS AND CORRESPONDING COATING PROCESS

BACKGROUND OF THE INVENTION

1. Field of the Invention

The present invention relates to production of fluorine doped tin oxide coatings using a liquid precursor. Such coatings may be used, for example, as heat reflective elements in double glazed windows.

2. Description of the Background Information

A precursor of the above type has been proposed in European Patent Document EP-A-0 158 399. This patent discusses the prior art and its applications in some detail along with the different processes used to produce such coatings, such as solution spraying, chemical vapor deposition, powder deposition, as well as the properties of the coatings including particular low sheet resistance and high visible light transmissivity. This document particularly mentions the drawbacks of known techniques such as the use of organic solvents which must be eliminated (Japanese Application 75-61415), difficulties in controlling the flow rate of the gaseous stream (EP-A-0 112 780), the danger of explosion and the toxic nature of the materials employed (U.S. Pat. No. 4,265,974), or the necessary use of high temperatures when using a solid precursor (U.S. Pat. No. 4,293,594).

Apart from the difficulties associated with the prior art processes, EP-A-0 158 399 emphasizes that, as taught in Japanese Application 75-61415 and EP-A-0 112 780, the electrical properties of the coatings obtained are not always satisfactory, and that generally they do not possess optimal transparency.

In order to overcome these drawbacks, EP-A-0 158 399 proposes a liquid composition including a mixture comprising (1), as the doping compound, an organic fluorine compound selected from trifluoroacetic acid, trifluoroacetic anhydride, ethyl trifluoroacetoacetate, trifluoroethanol, ethyl trifluoroacetate and pentafluoropropionic acid, (2) an organotin derivative selected from an alkyltin trichloride, a dialkyltin dichloride, an alkyldichlorotin acetate, a dialkyldichlorotin diacetate, a dialkylchlorotin acetate, an ester or tin tri- or tetrachloride, and (3) optionally a polar organic derivative whose function is to keep the composition stable and in a single phase at temperatures below the ambient temperature.

In the absence of the polar organic derivative, which is for example methylisobutylketone, acetone anhydride or ethyl acetate, constituents (1) and (2) are not miscible when cold which makes homogenous deposition difficult. Presence of the polar organic derivative renders the mixture homogeneous but inflammable, with a reduced deposition rate. In addition, pyrolysis yields are relatively low which has the drawback of producing a large quantity of solid residues containing tin oxide in the fume evacuation system.

Another prior art document, U.S. Pat. No. 4,857,095, proposes the use of a solution containing dibutoxydibutyltin and trifluoroacetic acid to produce a fluorine doped tin oxide layer. While the patent indicates that a very transparent coating is obtained with very low turbidity and no cloudiness, in fact, when the technique in question is employed, many white deposits are observed on the substrate glass and in the fume evacuation system.

JP-A-62 70247 (reported in Chemical Abstracts, Vol. 107, No. 6, Aug. 10, 1987, Columbus, Ohio, USA) teaches a composite solution made from:

a solution of a tin compound containing fluorine, such as a solution of dibutyltin (or dimethyltin) di(trifluoroacetate) or butyltin tri(triflouroacetate), and a solution of a tin compound containing chlorine, such as a solution of trichlorobutyltin or tetrachlorotin.

The solution is sprayed on heated glass substrates to form a fluorine doped $SnO_2$ coating having a low resistivity to infrared rays.

In all of the examples of this prior art document, the tin compounds containing fluorine and chlorine are in solution in trichloroethane. This solvent, like other chlorinated solvents, is dangerous and toxic.

Despite, as shown by the state of the art, a great deal of work on production of fluorine doped tin oxide coatings on substrates, there remains a need for a precursor which can produce fluorine doped tin oxide coatings of high quality, i.e., having a regular thickness and without blemishes, which can be deposited at the high speeds used in continuously coating flat "float" glass, without using an inflammable organic solvent and ending with products having low surface electrical resistance and a high light transmission coefficient.

It has now been discovered that by appropriately selecting the tin compounds containing chlorine and flourine, one obtains a precursor which, upon evaporation, provides a homogeneous phase whose quantitative and qualitative composition corresponds to that of the precursor. It then becomes possible to deposit this precursor during the vapor phase.

Such a vapor phase deposit is not possible in the case of the mixtures described by JP-A-62 70247 because, if they were subjected to the conditions of a vapor phase deposition, their solvent $CCl_3Me$ would evaporate before the di- or tri(fluoroalkanoates). This is why JP-A-62 70247 resorts to a liquid pyrolysis.

The vapor phase deposition has considerable advantages resulting from the absence of the solvent, which, as indicated above, not only has a harmful effect on health and the environment, but also detrimentally affects the deposition yield. Specifically, the presence of this solvent necessarily reduces the quantity of tin by unit of volume of the precursor, and it follows that the deposition rate of the fluorine doped tin layer on the glass is consequently reduced. Deposition by liquid pyrolysis is therefore less adapted to a continuous deposition on float glass than vapor phase deposition.

SUMMARY OF THE INVENTION

Accordingly, an object of the present invention is to provide a liquid precursor composition comprising a chlorinated organotin derivative and an organotin flouroalkanoate, such as the composite solution proposed by JP-A-62 70247, but which includes a mono(fluoroalkanoate), not the di- or tri(fluoroalkanoate) taught by JP-A-62 70247. The choice of a mono(fluoroalkanoate) allows the liquid precursor composition to be made without a solvent.

More specifically, the precursor of the invention comprises:

60 to 90% by weight of at least one chlorinated organotin derivative, wherein the tin atom is bound to at least one chlorine atom and to at least one carbon atom of a hydrocarbon chain;

5 to 30% by weight of at least one organotin mono(-fluoroalkanoate) wherein the tin atom is bound to at least one carbon atom of a hydrocarbon chain; and 0 to 15% by weight of a tetraorganotin compound wherein the tin atom is bound to four carbon atoms each forming part of a hydrocarbon chain.

The hydrocarbon chain may be saturated or unsaturated, acyclic or cyclic.

More precisely, the chlorinated organotin compound has the following general formula:

$$(R)_x\text{—}Sn\text{—}Cl_{(4-x)} \quad (I)$$

wherein x may be 1, 2 or 3 and radical or radicals R, which may be identical or different, represents an alkyl radical having one to eight carbon atoms or an alkenyl radical having two to eight carbon atoms or the phenyl radical, the alkyl or alkenyl radicals being straight chain or branched chain if the chain comprises at least three carbon atoms.

R preferably represents a methyl, butyl, isobutyl or octyl radical. Advantageously, compound (I) is monobutyltrichlorotin or dibutyldichlorotin.

The organotin mono(fluoroalkanoate) has the following general formula:

$$(R^1)_3\text{—}Sn\text{—}(OOC\text{—}R^2) \quad (II)$$

wherein radicals $R^1$ which may be identical or different, have the same meaning as for radicals R in formula (I) and radical $R^2$ represents a trifluoromethyl or pentafluoroethyl radical.

Preferably, $R^1$ is a methyl or butyl radical and $R^2$ is a trifluoromethyl radical. Advantageously, compound (II) is trimethyltin mono(trifluoroacetate) or tributyltin mono(trifluoroacetate).

The tetraorganotin derivative has the following general formula:

$$(R)_4Sn \quad (III)$$

wherein R has the same meaning as in formula (I). Preferably, radicals R, which may be identical or different, are methyl, butyl or isobutyl radicals. Advantageously, the four R radicals are identical and compound (III) is tetramethyltin, tetrabutyltin or tetraisobutyltin.

The invention also pertains to a process for coating a substrate with a thin layer of fluorine doped tin oxide by vapor phase deposition comprising vaporizing the precursor according to the invention at a temperature of between 120° and 300° C., drawing the vapor of the precursor into a current of heated air and bringing the resultant gaseous flux into contact with the substrate, the contact occurring at a temperature which is greater than the decomposition temperature of the precursor, generally greater than 350° C.

Preferably, the substrate is a float glass at a temperature of between about 400° C. and 700° C. at the moment of contact.

A coating may thus be obtained which, for example, has a sheet resistance of less than 35 ohm², an IR emissivity of less than 25% and a haze of less than 1% measured for a thickness of 4,900 Ångströms. Sheet resistance was measured in accordance with ASTM standard method F374 and haze was calculated as the ratio: (light diffused/total light transmitted)×100.

DETAILED DESCRIPTION OF THE PREFERRED EMBODIMENTS

The invention will now be described in more detail in the following examples:

One or more compounds of formula (I), one or more compounds of formula (II), and, if necessary, one or more compounds of formula (III) were mixed together in the proportions indicated in Table 1 below to produce a stable, clear solution at room temperature. For certain combinations of the compounds, a stable and clear solution was obtained at a temperature well below room temperature.

In order to use a chemical vapor phase deposition technique to produce a fluorine doped tin oxide coating on a float glass substrate using a liquid precursor comprising the above mixture, the liquid precursor must be heated to a temperature of between about 120° C. and 300° C., preferably between about 210° C. and 250° C. The vapor produced is drawn into a current of heated air at a temperature close to that of the precursor and metered through a feed line to obtain a concentration of about 0.5 to 2 liters of precursor per m³ of air. The gas stream is brought into contact with the heated glass which is at a temperature of between about 400° C. and 700° C., preferably between about 550° C. and 650° C. to produce a good deposition rate.

The gas flow rate varies from 1.5 to 2 liters per minute, while the glass, produced by a float process, moves at a speed of between about 5 and 20 meters per minute. The thickness of the coating deposited on the glass can be controlled by varying the gas flow rate and the concentration of precursor per m³ of air and taking into account the speed of the glass.

Using this technique and a precursor according to the invention, it is possible to obtain coatings with various thicknesses of up to about 800 nanometers.

EXAMPLES

The following Tables show, respectively:

Table 1—The composition of several examples of precursors according to the invention, Table 2—Coating process conditions, and Table 3—Characteristics of the coatings obtained.

In Table 1 below, Bu indicates butyl, Me indicates methyl, X=number of radicals and the proportions of compounds (I), (II) and (III) are shown under "%".

The precursors of Examples 1 to 4 formed stable, clear solutions at room temperature.

While the invention has been described with reference to several exemplary embodiments, it is understood that the words which have been used herein are words of description and illustration, rather than words of limitations. Changes may be made, without departing from the scope and spirit of the invention in its aspects. The invention extends to all functionally equivalent structures, methods and uses, such as are within the scope of the appended claims.

This application is related to French Patent Application 93.05245, filed May 3, 1993, whose priority is claimed, and which is hereby incorporated by reference in its entirety.

TABLE 1

Examples of compositions of precursors in accordance with the invention

| Example | Compound (I) R | x | % | Compound (II) R$^1$ | R$^2$ | % | Compound (III) R | % |
|---|---|---|---|---|---|---|---|---|
| 1 | Bu | 1 | 85 | Bu | CF$_3$ | 15 | — | — |
| 2 | Bu | 1 | 70 | Bu | CF$_3$ | 30 | — | — |
| 3 | Bu | 1 | 70 | Bu | CF$_3$ | 20 | Me | 10 |
| 4 | Bu | 1 | 60 | Bu | CF$_3$ | 30 | Me | 10 |

TABLE 2

Coating process conditions for vapor phase deposition

| Example | 1 | 2 | 3 | 4 |
|---|---|---|---|---|
| Air temperature (°C.) | 230 | 240 | 235 | 230 |
| Gas flow (liter/min) | 1.68 | 1.6 | 1.62 | 1.53 |
| Glass speed (m/min) | 16 | 16 | 16 | 16 |
| Glass temperature (°C.) | 615 | 625 | 615 | 625 |

TABLE 3

Characteristics of coatings obtained

| Example | 1 | 2 | 3 | 4 |
|---|---|---|---|---|
| Layer thickness (Ångström) | 4,900 | 4,900 | 4,900 | 4,900 |
| Sheet resistance (ohm$^2$) | 35 | 24 | 25 | 22 |
| IR emissivity (%) | 21 | 18 | 19 | 17 |
| Haze (%) | 1 | 0.4 | 0.5 | 0.4 |

We claim:

1. A liquid precursor for the production of fluorine doped tin oxide coatings including a chlorinated organotin derivative and an organotin fluoroalkanoate, comprising:

60 to 90% by weight of at least one chlorinated organotin derivative wherein the tin atom is bound to at least one chlorine atom and to at least one carbon atom of a hydrocarbon chain;

5 to 30% by weight of at least one organotin mono(fluoroalkanoate) wherein the tin atom is bound to at least one carbon atom of a hydrocarbon chain; and 0 to 15% by weight of a tetraorganotin compound wherein the tin atom is bound to four carbon atoms each forming part of a hydrocarbon chain.

2. The precursor according to claim 1, wherein the chlorinated organotin derivative comprises the following general formula:

$$(R)_x\text{—Sn—Cl}_{(4-x)}$$

wherein x may be 1, 2 or 3 and radical or radicals R, which may be identical or different, represents an alkyl radical having one to eight carbon atoms or an alkenyl radical having two to eight carbon atoms or the phenyl radical, the alkyl or alkenyl radicals being straight chain or branched chain if the chain comprises at least three carbon atoms.

3. The precursor according to claim 1, wherein the chlorinated organotin derivative comprises monobutyltrichlorotin.

4. The precursor according to claim 1, wherein the chlorinated organotin derivative comprises dibutyldichlorotin.

5. The precursor according to claim 1, wherein the organotin mono(fluoroalkanoate) comprises the following general formula:

$$(R^1)_3\text{—Sn—(OOC—R}^2)$$

wherein radicals R$^1$, which may be identical or different, represent an alkyl radical having one to eight carbon atoms or an alkenyl radical having two to eight carbon atoms or the phenyl radical, the alkyl or alkenyl radicals being straight chain or branched chain if the chain comprises at least three carbon atoms, and radical R$^2$ represents a trifluoromethyl or pentafluoroethyl radical.

6. The precursor according to claim 1, wherein the organotin mono(fluoroalkanoate) comprises trimethyltin mono(trifluoroacetate).

7. The precursor according to claim 1, wherein the organotin mono(fluoroalkanoate) comprises tributyltin mono(trifluoroacetate).

8. The precursor according to claim 1, wherein the tetraorganotin derivative comprises the following general formula:

$$(R)_4\text{Sn}$$

wherein R represents an alkyl radical having one to eight carbon atoms or an alkenyl radical having two to eight carbon atoms or the phenyl radical, the alkyl or alkenyl radicals being straight chain or branched chain if the chain comprises at least three carbon atoms.

9. The precursor according to claim 1, wherein the tetraorganotin derivative comprises tetramethyltin.

10. The precursor according to claim 1, wherein the tetraorganotin derivative comprises tetrabutyltin.

11. A precursor according to claim 1, wherein the tetraorganotin derivative comprises tetraisobutyltin.

12. A liquid precursor for the production of fluorine doped tin oxide coatings comprising:

60 to 90% by weight of at least one chlorinated organotin derivative comprising the following general formula:

$$(R)_x\text{—Sn—Cl}_{(4-x)}$$

wherein x may be 1, 2 or 3 and radical or radicals R, which may be identical or different, represents an alkyl radical having one to eight carbon atoms or an alkenyl radical having two to eight carbon atoms or the phenyl radical, the alkyl or alkenyl radicals being straight chain or branched chain if the chain comprises at least three carbon atoms;

5 to 30% by weight of at least one organotin mono(fluoroalkanoate) comprising the following general formula:

$$(R^1)_3\text{—Sn—(OOC—R}^2)$$

wherein radicals R$^1$, which may be identical or different, represent an alkyl radical having one to eight carbon atoms or an alkenyl radical having two to eight carbon atoms or the phenyl radical, the alkyl or alkenyl radicals being straight chain or branched chain if the chain comprises at least three carbon atoms and radical R² represents a trifluoromethyl or pentafluoroethyl radical; and 0 to 15% by weight of a tetraorganotin compound comprising the following general formula:

(R)₄Sn wherein R represents an alkyl radical having one to eight carbon atoms or an alkenyl radical having two to eight carbon atoms or the phenyl radical, the alkyl or alkenyl radicals being straight chain or branched chain if the chain comprises at least three carbon atoms.

13. A liquid precursor for the production of fluorine doped tin oxide coatings comprising:

at least one chlorinated organotin derivative wherein the tin atom is bound to at least one chlorine atom and to at least one carbon atom of a hydrocarbon chain; and at least one organotin mono(fluoroalkanoate) wherein the tin atom is bound to at least one carbon atom of a hydrocarbon chain.

14. The liquid precursor according to claim 13, comprising:

60 to 90% by weight of said at least one chlorinated organotin derivative; and 5 to 30% by weight of said at least one organotin mono(fluoroalkanoate).

15. The liquid precursor according to claim 14, further comprising a tetraorganotin compound wherein the tin atom is bound to four carbon atoms each forming part of a hydrocarbon chain.

16. The liquid precursor according to claim 15, comprising up to 15% by weight of said tetraorganotin compound.

* * * * *